(12) United States Patent
Hagiwara et al.

(10) Patent No.: US 6,898,763 B2
(45) Date of Patent: May 24, 2005

(54) INFORMATION PROCESSING APPARATUS CAPABLE OF SWITCHING SIGNAL PROCESSING OPERATION BETWEEN DIRECT AND PROCESSOR-BASED MODES

(75) Inventors: Kunihiko Hagiwara, Kawasaki (JP); Takatoshi Fukuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 560 days.

(21) Appl. No.: 09/995,830

(22) Filed: Nov. 29, 2001

(65) Prior Publication Data
US 2003/0043181 A1 Mar. 6, 2003

(30) Foreign Application Priority Data

Aug. 29, 2001 (JP) ........................................ 2001-260376

(51) Int. Cl.⁷ .............................. G06F 3/00; G09G 5/44
(52) U.S. Cl. .................... 715/716; 715/718; 715/720; 348/552; 348/719; 345/520; 345/211
(58) Field of Search .............................. 345/716, 719, 345/720, 721, 717, 718, 972, 502, 520, 531, 547, 211, 204, 212; 725/38, 37, 59, 131, 134, 133; 348/734, 552, 714, 718, 719, 720, 721, 730

(56) References Cited

U.S. PATENT DOCUMENTS

| | | | | |
|---|---|---|---|---|
| 5,249,164 A | * | 9/1993 | Koz ............................ 348/552 |
| 5,805,173 A | * | 9/1998 | Glennon et al. ......... 345/547 X |
| 5,917,467 A | | 6/1999 | Yoshimura ................... 345/112 |
| 6,204,884 B1 | | 3/2001 | Lee ............................. 348/555 |
| 6,442,328 B1 | * | 8/2002 | Elliott et al. ............ 725/133 X |
| 6,501,514 B1 | * | 12/2002 | Townsend et al. .......... 348/734 |
| 6,593,975 B1 | * | 7/2003 | Oh ............................. 348/730 |
| 2002/0047925 A1 | * | 4/2002 | Choi .......................... 348/552 |

FOREIGN PATENT DOCUMENTS

| | | |
|---|---|---|
| JP | 4-126479 | 4/1992 |
| JP | 6-110590 | 4/1994 |
| JP | 8-030247 | 2/1996 |
| JP | 8-202321 | 8/1996 |
| JP | 9-146508 | 6/1997 |
| JP | 10-210485 | 8/1998 |
| JP | 10-294910 | 11/1998 |

* cited by examiner

Primary Examiner—Raymond J. Bayerl
(74) Attorney, Agent, or Firm—Staas & Halsey LLP

(57) ABSTRACT

An information processing apparatus includes a tuner receiving a signal according to a received broadcast, a first processing part performing a desired processing on the signal supplied from the tuner, converting the signal into a first signal of a given format, and outputting the first signal, a second processing part converting the signal supplied from the tuner into a second signal of the given format and outputting the second signal, and an output part selectively outputting one of the first and second signals. The first and second processing parts are startable independently of each other.

20 Claims, 12 Drawing Sheets

INFORMATION PROCESSING APPARATUS CAPABLE OF SWITCHING SIGNAL PROCESSING OPERATION BETWEEN DIRECT AND PROCESSOR-BASED MODES

BACKGROUND OF THE INVENTION

1. Field of the Invention

The present invention generally relates to information processing apparatuses and methods of switching operations thereof, and more particularly to an information processing apparatus that is capable of receiving broadcasts and a method of switching operations thereof.

Recently, use of personal computers (PCs) as household appliances has been advanced so that it is desired that television (TV) broadcasts be watched on a PC monitor. However, in the case of using a PC only for watching the TV broadcasts, the function of the PC as a computer is unnecessary. Therefore, a system by which the TV broadcasts can be watched without starting the function of the PC as a computer is demanded.

2. Description of the Related Art

FIG. 1 is a block diagram showing a configuration of a conventional personal computer (PC) 1.

The PC 1 includes a PC main body 11, a monitor part 12 containing a television (TV) tuner 31, and an input device 13 so that TV broadcasts can be watched by means of the PC 1.

The input device 13 is composed of a keyboard or a mouse and used for inputting data or commands to the PC main body 11.

The PC main body 11 includes a central processing unit (CPU) 21, a random access memory (RAM) 22, a read-only memory (ROM) 23, a hard disk drive (HDD) 24, a video output part 25, and an input-output (I/O) control part 26, among which data can be exchanged via an internal bus 27.

The input device 13 is connected to the I/O control part 26, which supplies the data or commands input from the input device 13 to the internal bus 27. The CPU 21, for instance, performs data processing based on a program preinstalled in the HDD 24. The RAM 22, which is used as the working storage of the CPU 21, temporarily contains programs and data. The ROM 23, which contains a start-up program and a variety of setting values, is accessed at the time of starting the PC 1.

Video data processed in the CPU 21 is converted into an RGB signal in the video output part 25 to be supplied to the monitor part 12. The monitor part 12 includes the TV tuner 31, an operation part 32, an RGB converter circuit 33, a changeover switch 34, a display control circuit 35, and an image display part 36. The TV tuner 31 is connected to an antenna terminal Tant1 to which an antenna 41 is connected. Received signals supplied from the antenna 41 to the antenna terminal Tant1 are supplied to the TV tuner 31.

The TV tuner 31 selects the signal of a channel selected by an operation of the operation part 32 from the received signals supplied from the antenna terminal Tant1.

The TV tuner 31 outputs the NTSC (National Television System Committee) video signal of the selected channel. The video signal output from the TV tuner 31 is supplied to the RGB converter circuit 33. The RGB converter circuit 33 converts the NTSC video signal supplied from the TV tuner 31 into an RGB video signal. The video signal converted into the RGB signal in the RGB converter circuit 33 is supplied to the changeover switch 34. The changeover switch 34 selectively outputs one of an RGB video signal supplied from the PC main body 11 and the RGB video signal supplied from the RGB converter circuit 33 in accordance with an operation of the operation part 32.

The output video signal of the changeover switch 34 is supplied to the display control circuit 35. The display control circuit 35 controls the image display part 36 based on the RGB signal supplied from the changeover switch 34. The image display part 36, which is composed of, for instance, a cathode ray tube (CRT) or a liquid crystal display (LCD), is controlled by the display control circuit 35 so as to display an image on a screen in accordance with the RGB video signal supplied from the changeover switch 34.

According to the above-described configuration, TV programs can be watched on the monitor part 12 without starting the PC main body 11 in the PC 1.

FIG. 2 is a block diagram showing a configuration of another conventional PC 50. In FIG. 2, the same elements as those of FIG. 1 are referred to by the same numerals, and a description thereof will be omitted.

The PC 50 includes a PC main body 51 and a monitor part 52 that are different in configuration from the PC main body 11 and the monitor part 12 of the PC 1 of FIG. 1.

The PC main body 51 includes an antenna terminal Tant2. An antenna 71 is connected to the antenna terminal Tant2 so as to supply received TV broadcasting signals thereto. The received signals supplied to the antenna terminal Tant2 are supplied to a TV tuner 61. The TV tuner 61 selectively outputs one of the received signals which one is of a channel selected by the input device 13.

The output received signal of the TV tuner 61 is supplied to a bridge circuit 62.

The bridge circuit 62 converts the signal supplied from the TV tuner 61 into data that is exchangeable through the internal bus 27. The data obtained in the bridge circuit 62 is supplied to the video output part 25.

The video input part 25, which is, for instance, an AGP (accelerated graphics port) compliant video card or a PCI (peripheral component interconnect) bus compliant video card, converts the video data supplied from the TV tuner 61 into an RGB video signal, and supplied the RGB video signal to the monitor part 52. The monitor part 52, which is composed of the display control circuit 35 and the image display part 36, displays an image on a screen on the basis of the video data supplied from the PC main body 51.

According to the above-described configuration, TV programs can be watched on the monitor part 52 in the PC 50. Further, the bridge circuit 62 converts an NTSC video signal received by the TV tuner 61 into data exchangeable through the internal bus 27. Therefore, TV broadcasts can be stored in the HDD 24 in the form of data as converted.

FIG. 3 is a block diagram showing a configuration of another conventional PC 80. In FIG. 3, the same elements as those of FIGS. 1 and 2 are referred to by the same numerals, and a description thereof will be omitted.

The PC 80 is a combination of the PC main body 51 of the PC 50 of FIG. 2 and the monitor part 12 of the PC 1 of FIG. 1. In the PC 80, in the case of watching a TV broadcast without starting the PC main body 51, the TV broadcast is displayed on the screen of the monitor part 12 by operating the operation part 32 of the monitor part 12, converting a TV broadcast signal into an RGB video signal in the RGB converter circuit 33, and controlling the image display part 36 by the display control circuit 35.

Further, in the case of processing the TV broadcast in the PC main body 51, for instance, in the case of storing the TV broadcast in the HDD 24, first, the PC main body 51 is turned on, then, a video signal supplied from the TV tuner 61 is converted into data in the bridge circuit 62, next, the data is supplied to the HDD 24 via the internal bus 27, and the data according to the TV broadcast is stored in the HDD 24. In the case of watching the TV broadcast stored in the HDD 24, the PC main body 51 is started, and the data according to the TV broadcast to be watched is read out from the HDD 24 to be supplied to the video output part 25. The video output part 25 converts the read-out data into an RGB video signal. The RGB video signal is supplied from the video output part 25 to the monitor part 12. In the monitor part 12, the changeover switch 34 is operated in advance by the operation part 32 so that the video signal supplied from the PC main body 51 is supplied to the display control circuit 35. Thereby, the video signal supplied from the PC main body 51 is supplied to the display control circuit 35. The display control circuit 35 controls the image display part 36 in accordance with the video signal supplied from the PC main body 51. An image according to the video signal supplied from the PC main body 51 is displayed on the screen in the image display part 36.

The PC 1 of FIG. 1 has the monitor part 12 containing the TV tuner 31. Therefore, the TV broadcasts can be watched only by turning on the monitor part 12 without turning on the PC main body 11 to start an operating system (OS). However, since a video signal obtained by the TV tuner 31 is not supplied to the PC main body 11, there is a problem that the received video signal is prevented from being stored in the HDD 24 contained in the PC main body 11.

Further, there is another problem that the TV broadcasts are prevented from being watched if the monitor part 12 is replaced by a monitor that does not contain the TV tuner 31.

The PC 50 of FIG. 2 has the TV tuner 61. Connected to the internal bus 27. Therefore, a received TV image can be stored in the HDD 24 housed in the PC main body 51. However, it is always required to turn on the PC main body 51 to watch the television broadcasts on the monitor part 52. Therefore, if the PC main body is turned off, the television broadcasts can be watched only after the OS of the PC main body is started. Moreover, there is a problem of increased power consumption since the PC main body 51 also needs to be turned on in the case of only watching the television broadcasts on the monitor part 52.

The PC 80 of FIG. 3 requires both monitor part 12 and PC main body 51 to contain the TV tuners 31 and 61, respectively. This causes a problem of increased production costs. Further, there is another problem that the function of watching the television broadcasts without turning on the PC main body 51 cannot be used if the monitor part 12 is replaced by a monitor without a built-in TV tuner, such as the monitor part 52.

SUMMARY OF THE INVENTION

It is a general object of the present invention to provide an information processing apparatus and a method of switching operations thereof in which the above-described disadvantages are eliminated.

A more specific object of the present invention is to provide an information processing apparatus having a simple configuration and good operability for watching TV broadcasts.

The above objects of the present invention are achieved by an information processing apparatus including a tuner receiving a signal according to a received broadcast, a first processing part performing a desired processing on the signal supplied from the tuner, converting the signal into a first signal of a given format, and outputting the first signal, a second processing part converting the signal supplied from the tuner into a second signal of the given format and outputting the second signal, and an output part selectively outputting one of the first and second signals, wherein the first and second processing parts are startable independently of each other.

According to the above-described information processing apparatus, the signal of the received broadcast can be output from the second processing part without activating the first processing part. Therefore, power consumption can be reduced in the case of only watching the broadcast. Further, the broadcast can be watched without waiting for an OS or a program to be started or activated since it is not required to start the first processing part.

The above objects of the present invention are also achieved by a method of switching operations of an information processing apparatus, wherein a first operation of receiving a broadcast and performing desired information processing on a signal of the received broadcast and a second operation of receiving a broadcast, converting a signal of the received broadcast directly into a signal of a given format, and outputting the converted signal are independently performable in the information processing apparatus.

According to the above-described method, the same effects as those described above can be produced.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description will now be given, with reference to the accompanying drawings, of embodiments of the present invention.

Figure 1:
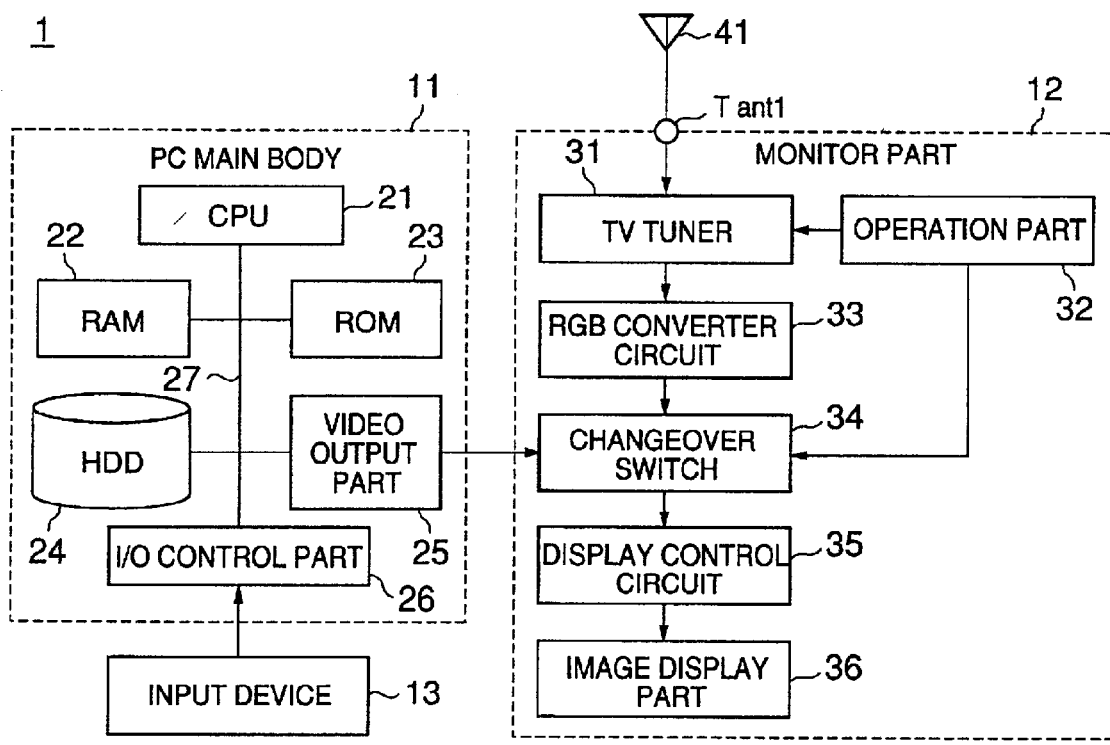
FIG. 1 is a block diagram showing a configuration of a conventional personal computer (PC)
Figure 2:
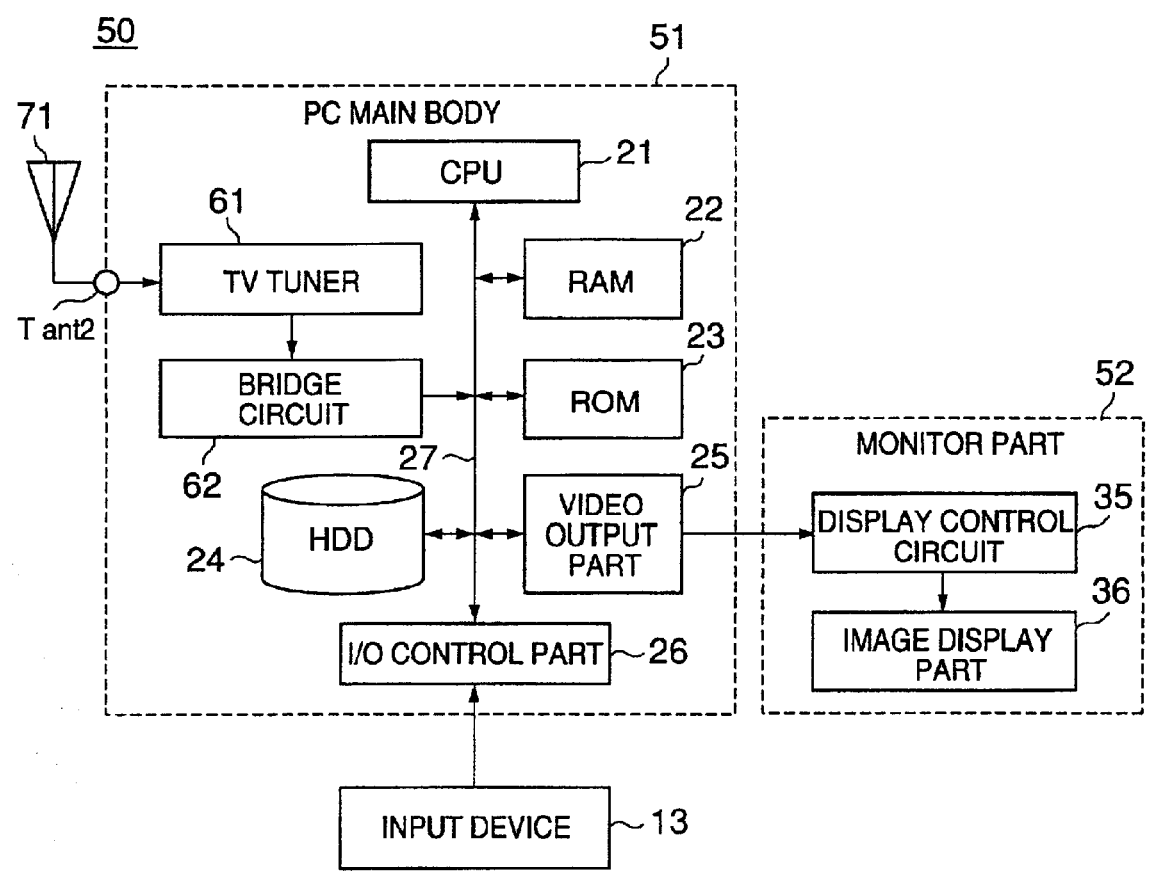
FIG. 2 is a block diagram showing a configuration of another conventional PC.
Figure 3:
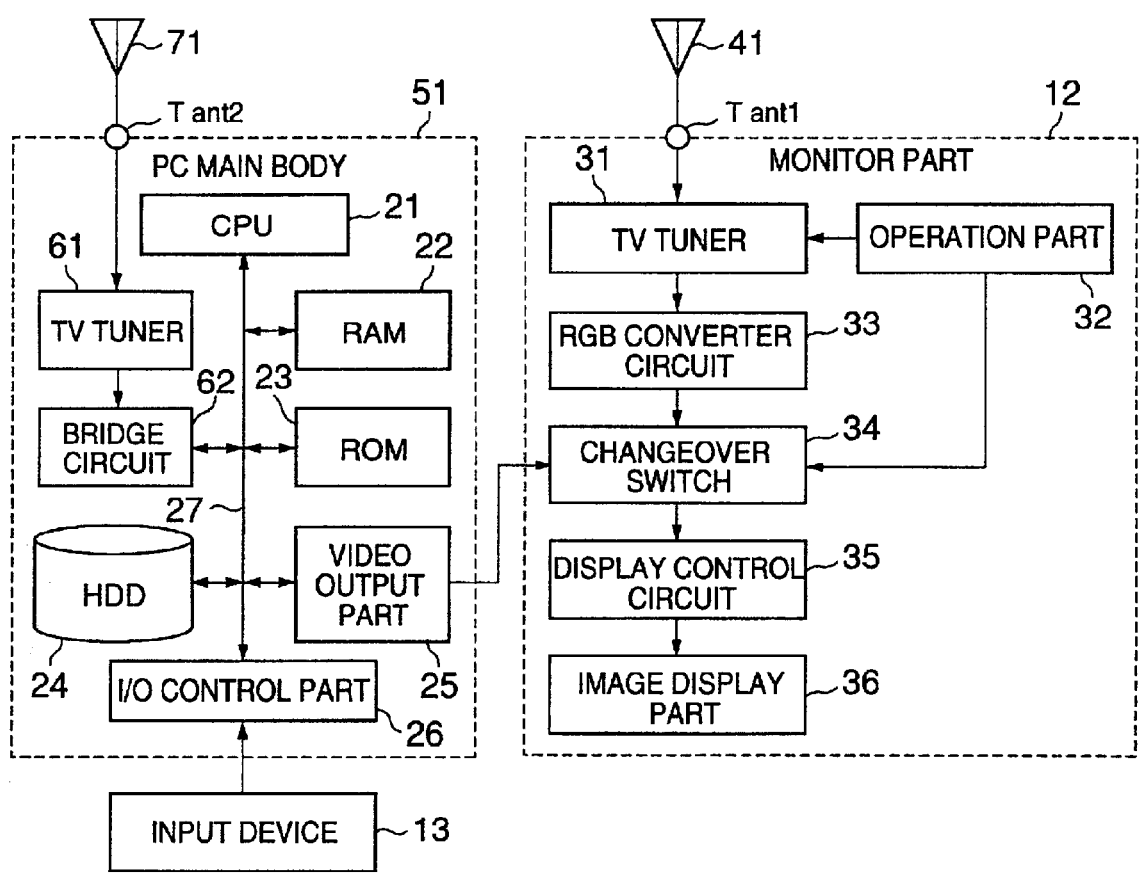
FIG. 3 is a block diagram showing a configuration of another conventional PC.
Figure 4:
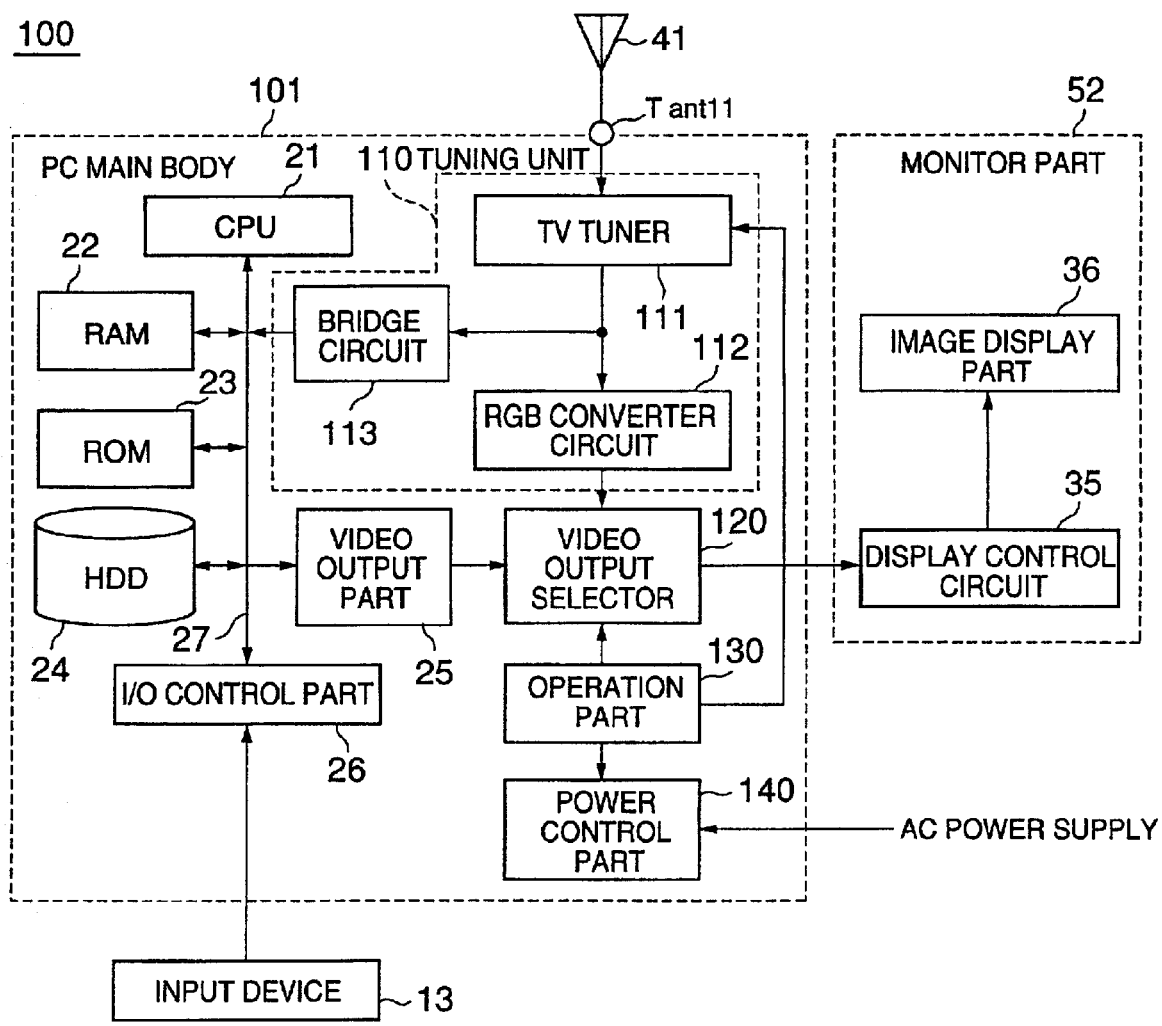
FIG. 4 is a block diagram showing a configuration of a PC according to a first embodiment of the present invention.
Figure 5:
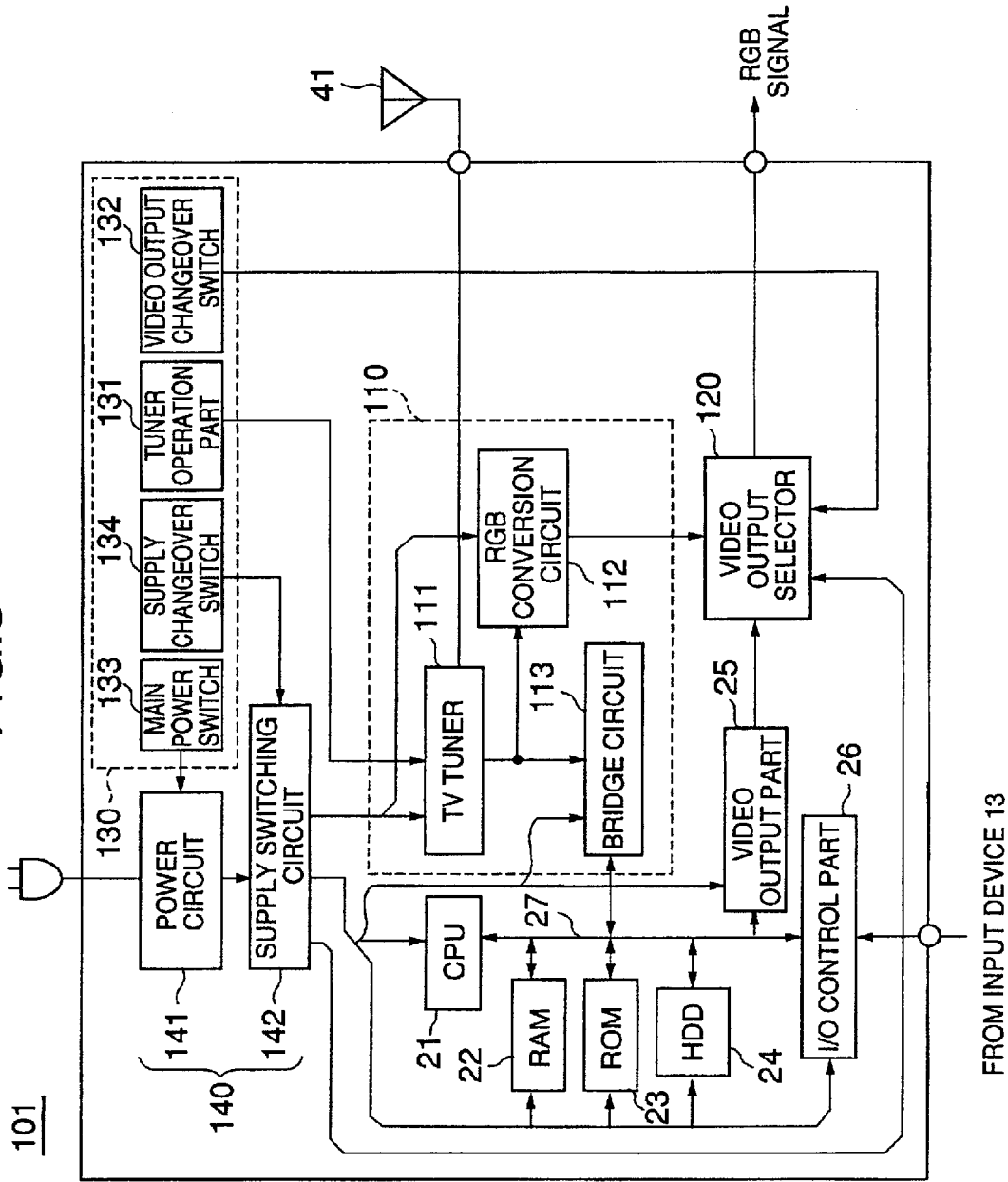
FIG. 5 is a block diagram showing a configuration of a PC main body of the PC.

FIG. 4 is a block diagram showing a configuration of a personal computer (PC) 100 according to a first embodiment of the present invention. FIG. 5 is a block diagram showing a configuration of a PC main body 101 of the PC 100. In FIGS. 4 and 5, the same elements as those of FIGS. 1 through 3 are referred to by the same numerals, and a description thereof will be omitted.

The PC 100 includes the input device 13, the PC main body 101, and the monitor part 52. The PC main body 101, which is an information processing apparatus, includes a tuning unit 110, a video output selector 120, an operation part 130, and a power control part 140.

The PC main body includes an antenna terminal Tant11. The antenna 41 is connected to the antenna terminal Tant11 so as to supply received signals thereto. The received signals supplied to the antenna terminal Tant11 are supplied to the tuning unit 110.

The tuning unit 110, which is composed of, for instance, a PCI card or an ISA (industrial standard architecture) card, is attached to a card slot connected to the internal bus 27. The tuning unit 110 includes a television (TV) tuner 111, an RGB converter circuit 112, and a bridge circuit 113. The received signals are supplied from the antenna terminal Tant11 to the TV tuner 111. A tuning signal is also supplied to the TV tuner 111 from a tuner operation part 131 of the operation part 130 as shown in FIG. 5. The TV tuner 111 selects one of the received signals supplied from the antenna terminal Tant11 which one is of a desired channel selected by an operation of the tuner operation part 131, and output the selected video signal of the desired channel. At this point, the TV tuner 111 outputs an NTSC video signal, for instance. The NTSC video signal selected in the TV tuner 111 is supplied to the RGB converter circuit 112 and the bridge circuit 113.

The RGB converter circuit 112 converts the NTSC video signal supplied from the TV tuner 111 into an RGB video signal. The RGB video signal is supplied from the RGB converter circuit 112 to the video output selector 120.

The bridge circuit 113 converts the NTSC video signal supplied from the TV tuner 111 into such digital data that is exchangeable with the CPU 21, the HDD 24, and the video output part 25 through the internal bus 27. The data supplied to the internal bus 27 is compressed by an image compression program to be stored in the HDD 24.

Video data for forming an image to be displayed by a program in execution by the CPU 21 is supplied via the internal bus 27 to the video output part 25. The video output part 25 converts the video data supplied through the internal bus 27 into an RGB video signal to be supplied to the monitor part 52. The compressed video data for a television broadcast stored in the HDD 24, for instance, is read out from the HDD 24 and expanded by an video (image) reproduction program to be supplied to the video output part 25.

The RGB video signal obtained output from the video output part 25 is supplied to the video output selector 120. The video output selector 120 supplies the monitor part 52 with one of the RGB video signal supplied from the RGB converter circuit 112 and the RGB video signal supplied from the video output part 25 based on a selection signal supplied from a video output changeover switch 132 of the operation part 130. Thereby, the video signal according to the television broadcast or the video signal of the image formed by the program executed by the CPU 21 is selectively displayed on the monitor part 52 by operating the video output selection switch 132.

The power control part 140 includes a power circuit 141 and a supply switching circuit 142. The power circuit 141 generates a constant voltage from a commercial power supply, and supplies the constant voltage to the supply switching circuit 142. The power circuit 141 supplies or cuts the constant voltage to the supply switching circuit 142 based on an operation of a main power switch 133 of the operation part 130.

The supply switching circuit 142 determines based on an operation of the supply changeover switch 134 whether to supply the power supplied from the power circuit 141 to the CPU 21, the RAM 22, the ROM 23, the HDD 24, the video output part 25, the I/O control part 26, and the bridge circuit 113 or to the TV tuner 111 and the RGB converter circuit 112, which may be referred to collectively as a TV tuner part of the PC main body 101. The power circuit 141 constantly supplies the power to the video output selector 120 so that the video signal can be supplied to the monitor part 52.

Next, a description will be given of TV broadcast watching methods by means of the PC 100 of this embodiment.

There are two methods for watching a TV broadcast on the monitor part 52 according to this embodiment: the first method of watching the TV broadcast with the computer function of the PC 100 being switched off and the second method of watching the TV broadcast with the computer function being switched on.

Figure 6:
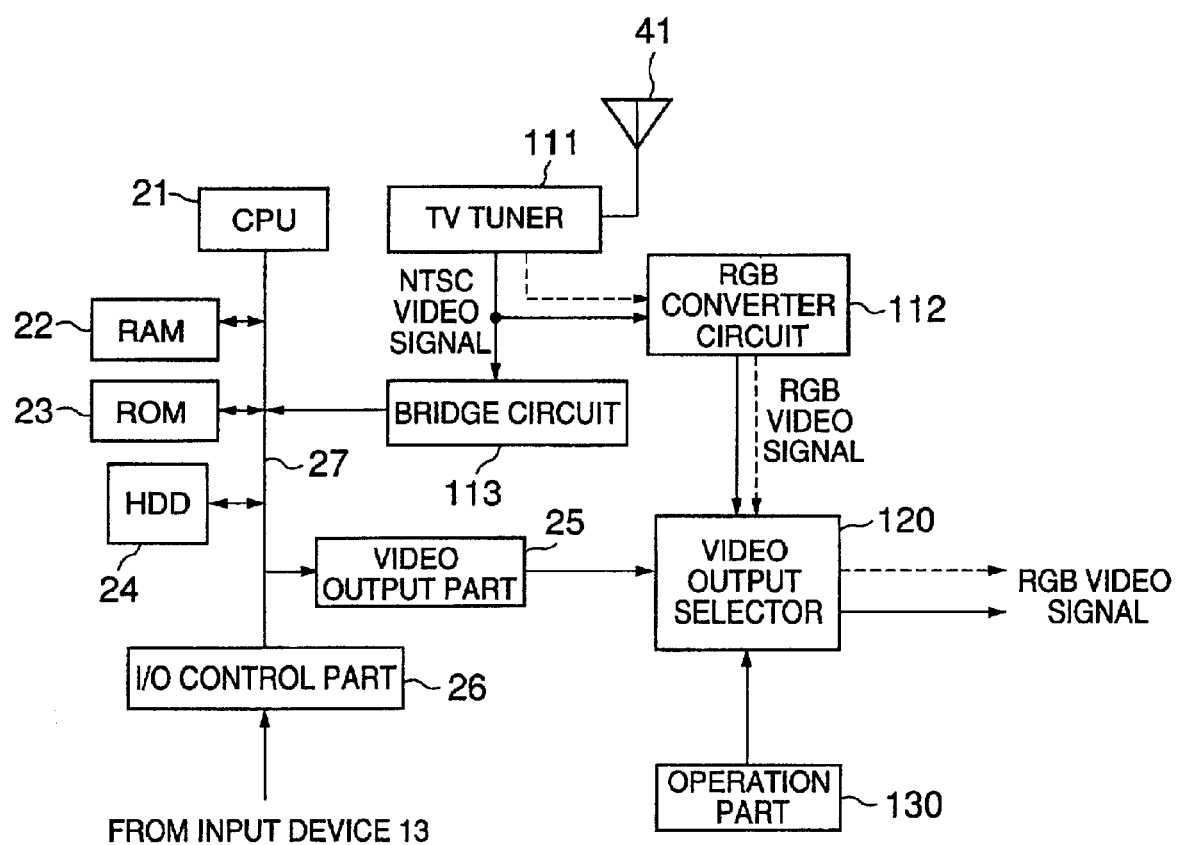
FIG. 6 is a diagram for illustrating an operation of the PC main body according to a first TV broadcast watching method of the first embodiment of the present invention.
Figure 7:
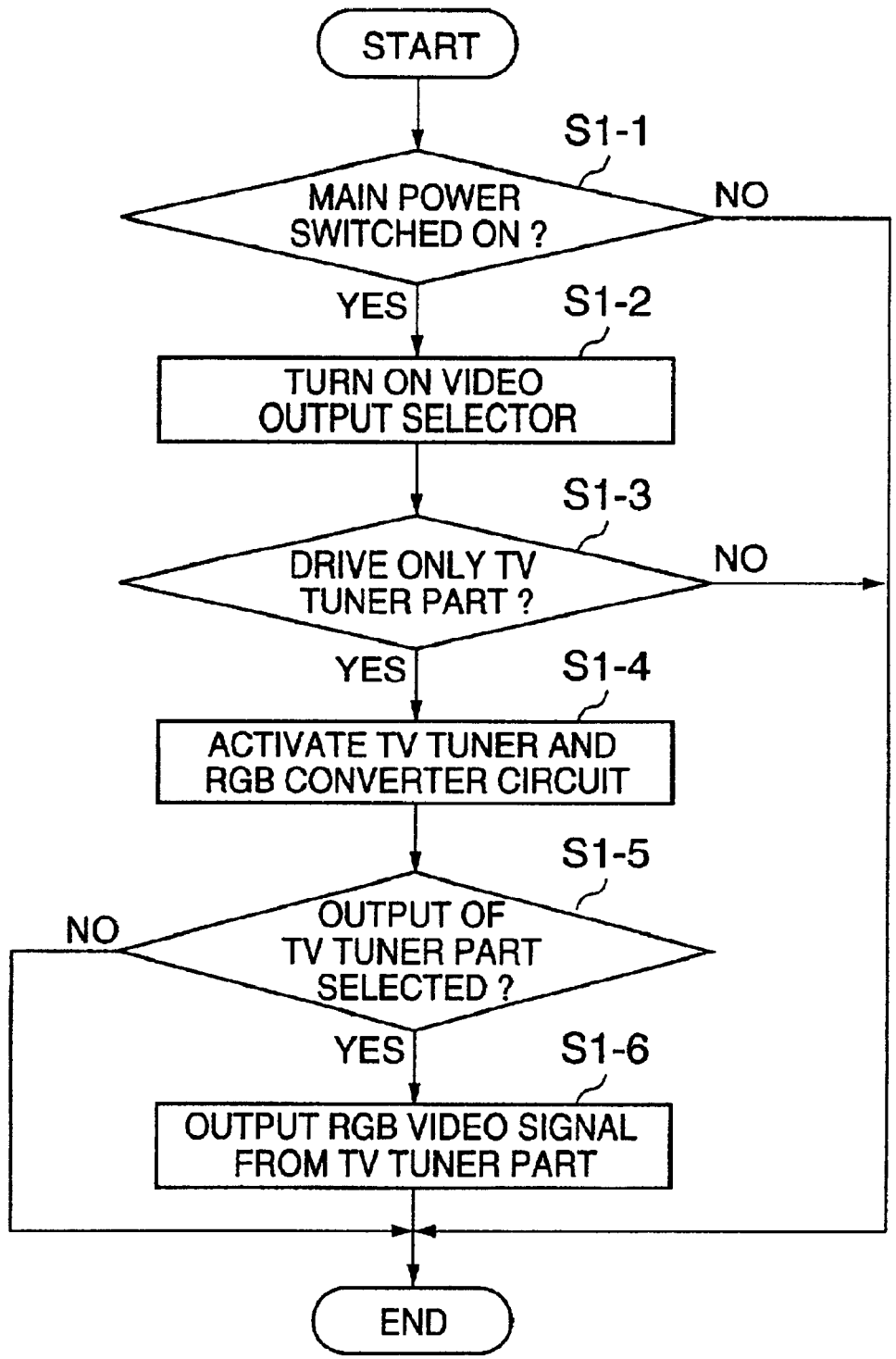
FIG. 7 is a flowchart of the operation of the PC main body at a time of watching a TV broadcast by the first TV broadcast watching method.

FIG. 6 is a diagram for illustrating an operation of the PC main body 101 according to the first TV broadcast watching method of the first embodiment of the present invention. FIG. 7 is a flowchart of the operation of the PC main body 101 at the time of watching a TV broadcast by the first TV broadcast watching method.

If the main power switch 133 is switched on in step S1-1 of FIG. 7, in step S1-2, a power is supplied to the video output selector 120 so that a video signal can be selected. If a selection is made by the supply changeover switch 134 in step S13 so as to prevent the OS of the PC 100 from being started, that is, so as to start only the TV tuner part, in step S1-4, a driving voltage is supplied to the TV tuner 111 and the RGB converter circuit 112 by the supply switching circuit 142.

Thereby, the TV tuner 111 and the RGB converter circuit 112 enter an active state. The TV tuner 111 is activated to select the NTSC video signal of a channel selected by an operation of the tuner operation part 131 and output the NTSC video signal. The NTSC video signal output from the TV tuner 111 is supplied through a path indicated by a broken line in FIG. 6 to the RGB converter circuit 112. The RGB converter circuit 112 converts the NTSC video signal into an RGB video signal and supplies the RGB video signal to the video output selector 120 as indicated by a broken line in FIG. 6.

If the RGB video signal supplied from the RGB converter circuit 112 is selected by the video output changeover switch 132 in step S1-5, in step S1-6, the video output selector 120 selects the RGB video signal supplied from the RGB converter circuit 112 and supplies the RGB video signal to the monitor part 52 as indicated by a broken line in FIG. 6.

Thereby, the TV broadcast is displayed on the monitor part 52. Thus, the TV broadcast can be displayed on the monitor part 52 without starting the OS and programs for activating the CPU 21, the RAM 22, the ROM 23, the HDD 24, the video output part 25, and the bridge circuit 113.

Figure 8:
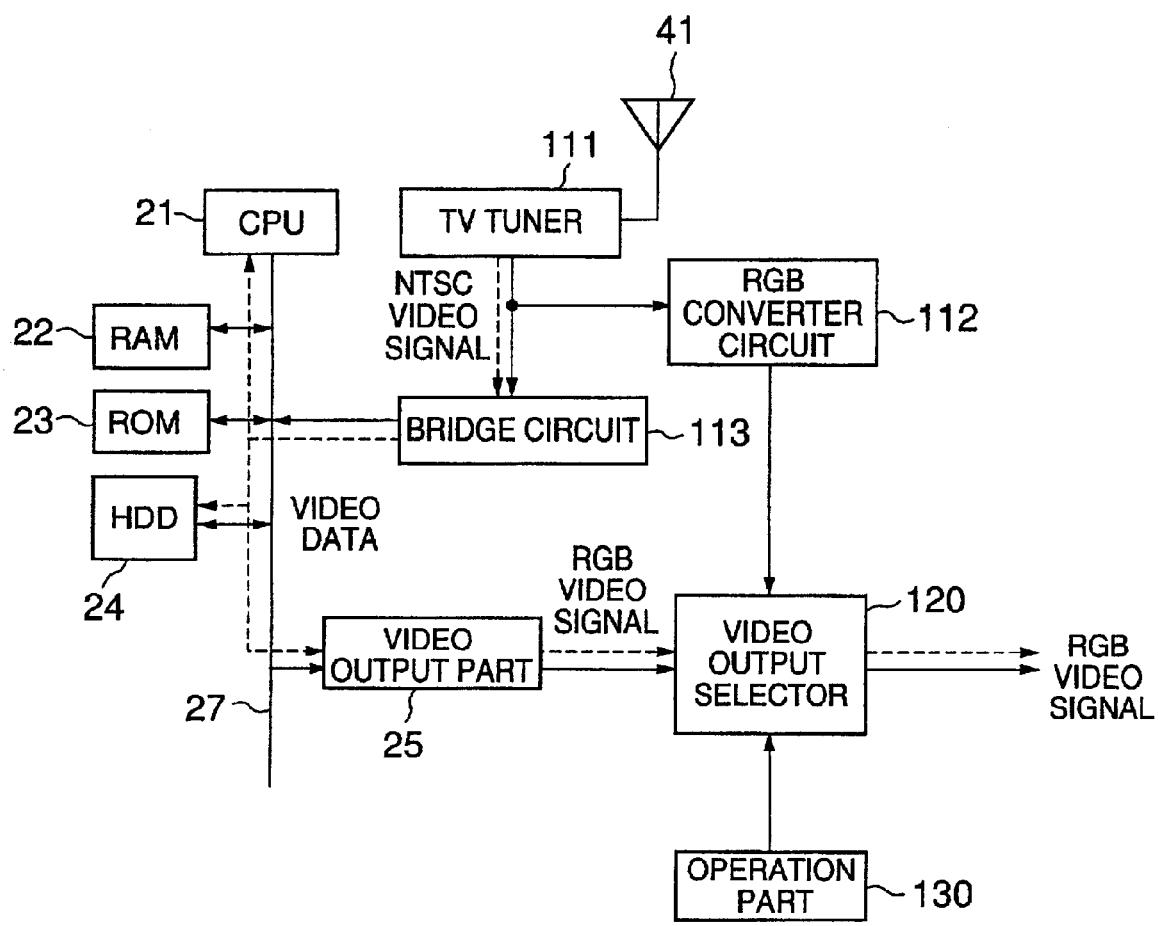
FIG. 8 is a diagram for illustrating an operation of the PC main body according to a second TV broadcast watching method of the first embodiment of the present invention.
Figure 9:
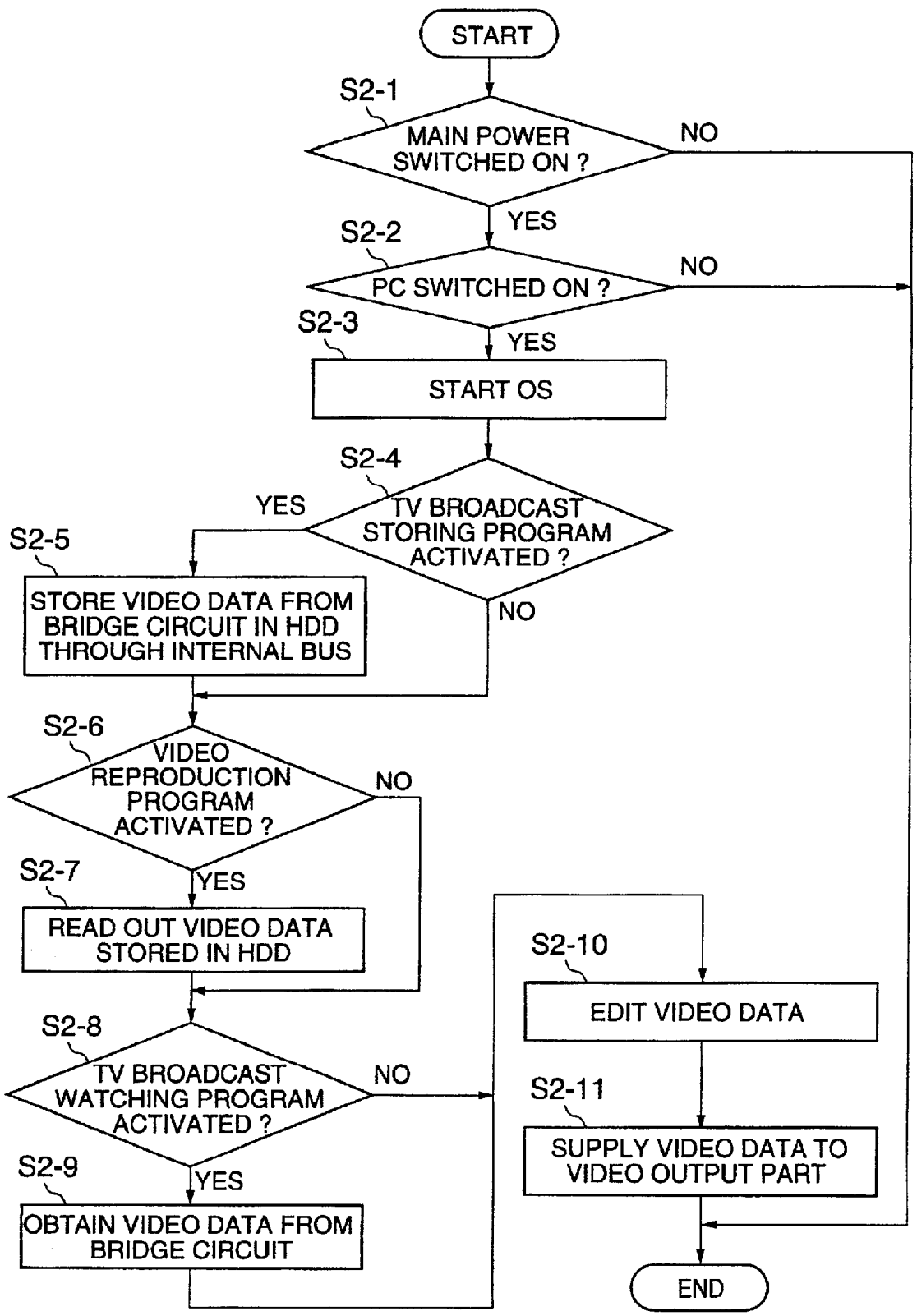
FIG. 9 is a flowchart of the operation of the PC main body according to the second TV broadcast watching method.

FIG. 8 is a diagram for illustrating an operation of the PC main body 101 according to the second TV broadcast watching method of the first embodiment of the present invention. FIG. 9 is a flowchart of the operation of the PC main body 101 according to the second TV broadcast watching method.

In the case of watching the TV broadcast by the second method, if the main power switch 133 is switched on in step S2-1, and a selection is made by the supply changeover switch 134 in step S2-2 so as to switch on the PC main body 101, a voltage generated in the power circuit 141 is supplied to the CPU 21, the RAM 22, the ROM 23, the HDD 24, the video output part 25, the I/O control part 26, the TV tuner 111, the RGB converter circuit 112, the bridge circuit 113, and the video output selector 120. When the power is supplied to the CPU 21, the RAM 22, the ROM 23, the HDD 24, the video output part 25, the I/O control part 26, and the bridge circuit 113, in step S2-3, the OS is started. The TV tuner 111 is activated to select the video signal of a channel selected by an operation of the tuner operation part 131, and outputs the selected video signal. At this point, the TV tuner 111 outputs an NTSC video signal.

The NTSC video signal output from the TV tuner 111 is supplied through a path indicated by a broken line in FIG. 8 to the bridge circuit 113. The bridge circuit 113 converts the NTSC video signal supplied from the TV tuner 111 into video data that is exchangeable through the internal bus 27.

If a TV broadcast storing program is activated in step S2-4, in step S2-5, the video data is supplied from the bridge circuit 113 through the internal bus 27 to the HDD 24. The video data is stored in the HDD 24. The TV broadcast storing program is preinstalled in the HDD 24 and activated by an operation of the input device 13.

Further, if the video reproduction program is activated in step S2-6, in step S2-7, the video data stored in the HDD 24 is read out therefrom. Further, if a TV broadcast watching program is activated in step S2-8, in step S2-9, the video data is obtained from the bridge circuit 113.

In step S2-10, the video data obtained in steps S2-7 and S2-9 is edited for multi screen display, and in step S2-11, the edited video data is supplied through the internal bus 27 to the video output part 25. The video output part 25 converts the video data supplied from through the internal bus 27 into an RGB video signal and supplies the RGB video signal to the video output selector 120.

Since the video signal is also supplied from the TV tuner 111 to the RGB converter circuit 112 as described in steps S1-1 through S1-4 of FIG. 7 of the first method, the video output selector 120 is supplied with the thus-converted video signal from the video output part 25 and the video signal from the RGB converter circuit 112. If the video signal supplied from the video output part 25 is selected by the video output changeover switch 132, the video output selector 120 supplied the video signal supplied from the video output part 25 to the monitor part 52. If the video signal supplied from the RGB converter circuit 112 is selected by the video output changeover switch 132, the video output selector 120 supplied the video signal supplied from the RGB converter circuit 112 to the monitor part 52.

The video signal selected in the video output selector 120 is supplied to and displayed on the monitor part 52. Thus, with the CPU 21, the RAM 22, the ROM 23, the HDD 24, the video output part 25, and the bridge circuit 113 being in an active state, that is, with the OS being in an operating state, the TV broadcast can be stored in the HDD 24 by the TV broadcast storing program and the video data stored in the HDD 24 can be reproduced by the video reproduction program.

Although the desired channel is selected by the tuner operation part 131 provided in the PC main body 101 in the first embodiment, the desired channel may be selected by a remote controller.

Figure 10:
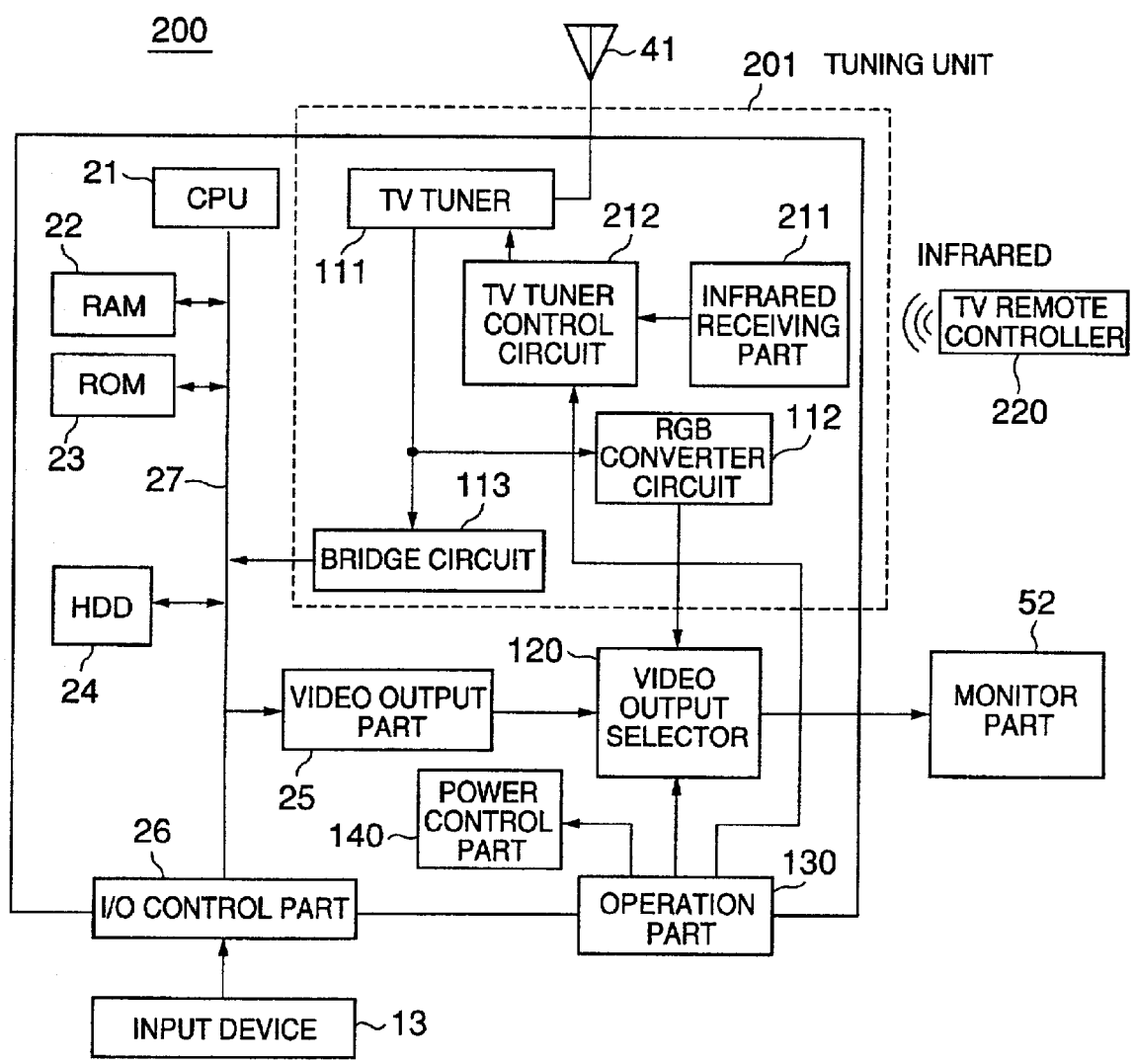
FIG. 10 is a block diagram showing a configuration of a PC according to a second embodiment of the present invention.

FIG. 10 is a block diagram showing a configuration of a PC 200 according to a second embodiment of the present invention. In FIG. 10, the same elements as those of FIG. 4 are referred to by the same numerals, and a description thereof will be omitted.

The PC 200 includes a tuning unit 201 that is different in configuration from the tuning unit 110 of the first embodiment. The tuning unit 201 includes an infrared receiving part 211 and a TV tuner control circuit 212 in addition to the TV tuner 111, the RGB converter circuit 112, and the bridge circuit 113.

A TV remote controller 220 has a plurality of key switches, and emits infrared rays if any of the key switches is pressed down. The emitted infrared rays blink according to the pattern of a code corresponding to the pressed key switch. The infrared receiving part 211 contains a light-receiving element to receive the infrared rays emitted from the TV remote controller 220, and converts the received infrared rays into an electrical signal according to the pattern of the infrared rays. The generated electrical signal is amplified and supplied to the TV tuner control circuit 212.

The TV tuner control circuit 212 controls the TV tuner 111 based on the electrical signal supplied from the infrared receiving part 211, and switches channels to be selected.

At this point, like the TV tuner 111, the infrared receiving part 211 and the TV tuner control circuit 212 are supplied with power from the power control part 140. Thereby, channel selection can be made by means of the TV remote controller 220 in both cases where the CPU 21, the HDD 24, and the video output part 25 are in operation and are not in operation.

In the above-described second embodiment, the TV tuner 111 is controlled by means of the TV remote controller for infrared communication. The TV tuner 111 can be controlled with more accuracy by means of a wireless local area network (LAN) system (a wireless communication system).

Figure 11:
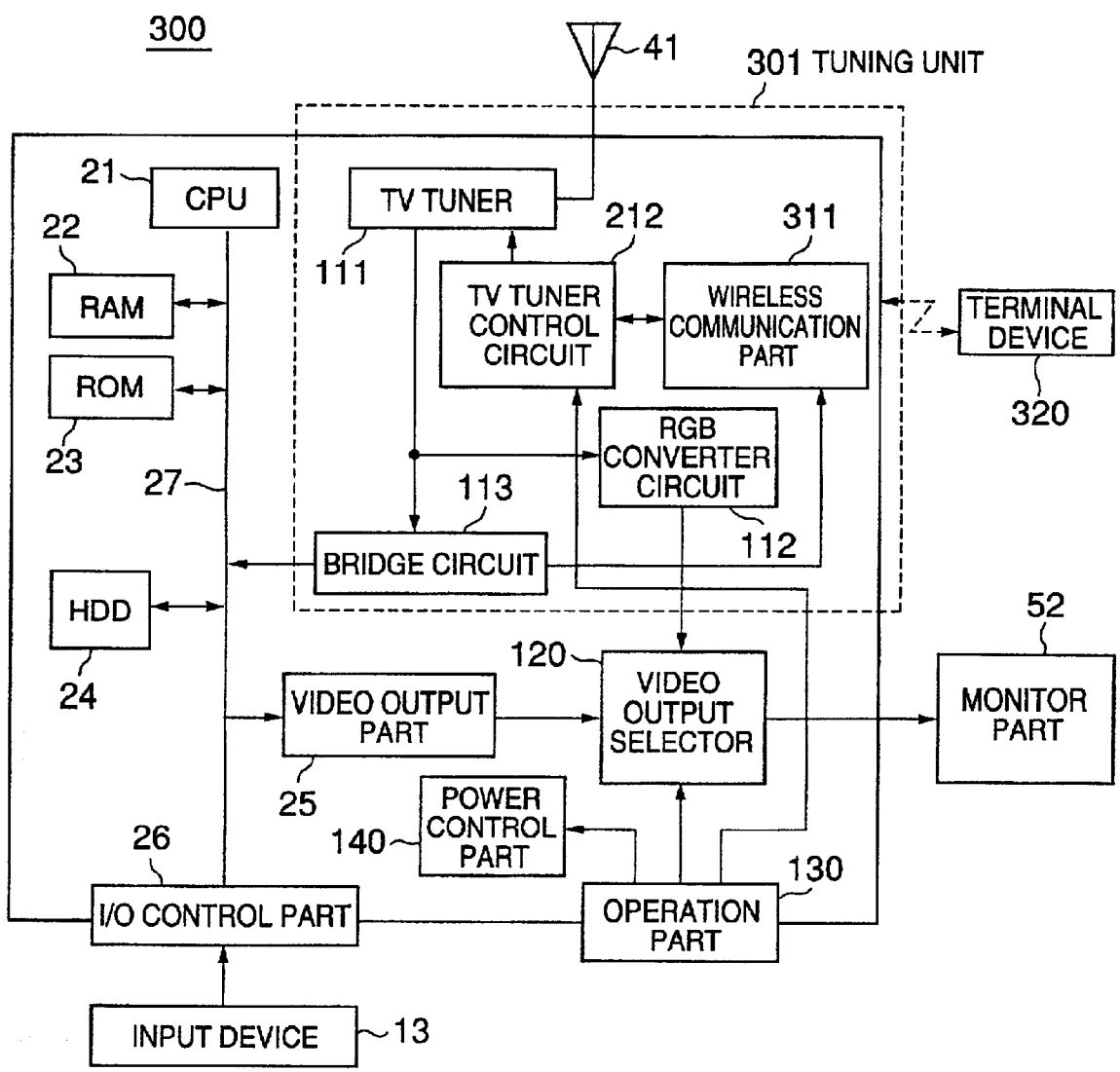
FIG. 11 is a block diagram showing a configuration of a PC according to a third embodiment of the present invention.

FIG. 11 is a block diagram showing a configuration of a PC 300 according to a third embodiment of the present invention. In FIG. 11, the same elements as those of FIG. 10 are referred to by the same numerals, and a description thereof will be omitted.

The PC 300 includes a tuning unit 301 that is different in configuration from the tuning unit 201 of FIG. 10 of the second embodiment. The tuning unit 301 includes a wireless communication part 311 instead of the infrared receiving part 211 of the tuning unit 201. The wireless communication part 311 configures a wireless communication system with a terminal device 320 so that wireless communication can be performed therebetween.

The wireless communication part 311 and the terminal device 320 perform communication in compliance with a communication standard called Bluetooth. Bluetooth is a protocol for data communication with a device within a distance of approximately ten meters at a communication rate of 1 Mbps by using a radio frequency band of 2.4 GHz. If the infrared communication of the second embodiment were employed herein, an obstacle between the wireless communication part 311 and the terminal device 320 would block communication therebetween since infrared communication is directional. However, in this embodiment, communication is performable between the wireless communication part 311 and the terminal device 320 even if there is a shield therebetween since non-directional radio waves are used according to the Bluetooth standard.

Further, by connecting the wireless communication part 311 and the terminal device 320 by a wireless communication system, a TV broadcast can be watched on the terminal device 320.

First, a video signal selected by the TV tuner 111 is converted into video data in the bridge circuit 113 to be supplied to the wireless communication part 311. The wireless communication part 311 converts the video data into data conformable to a wireless communication system standard such as the Bluetooth standard, and transmits the data to the terminal device 320. After receiving the data transmitted from the wireless communication part 311, the terminal device 320 extracts the video data and displays the extracted video data on a display.

Since the tuning unit 301 can be controlled from the terminal device 320 by employing a wireless communication system conformable to a standard such as the Bluetooth standard, a channel can be selected freely.

Although the first and second embodiments deal with TV broadcasting by ground waves or via satellite, an image may be input from an external input.

Figure 12:
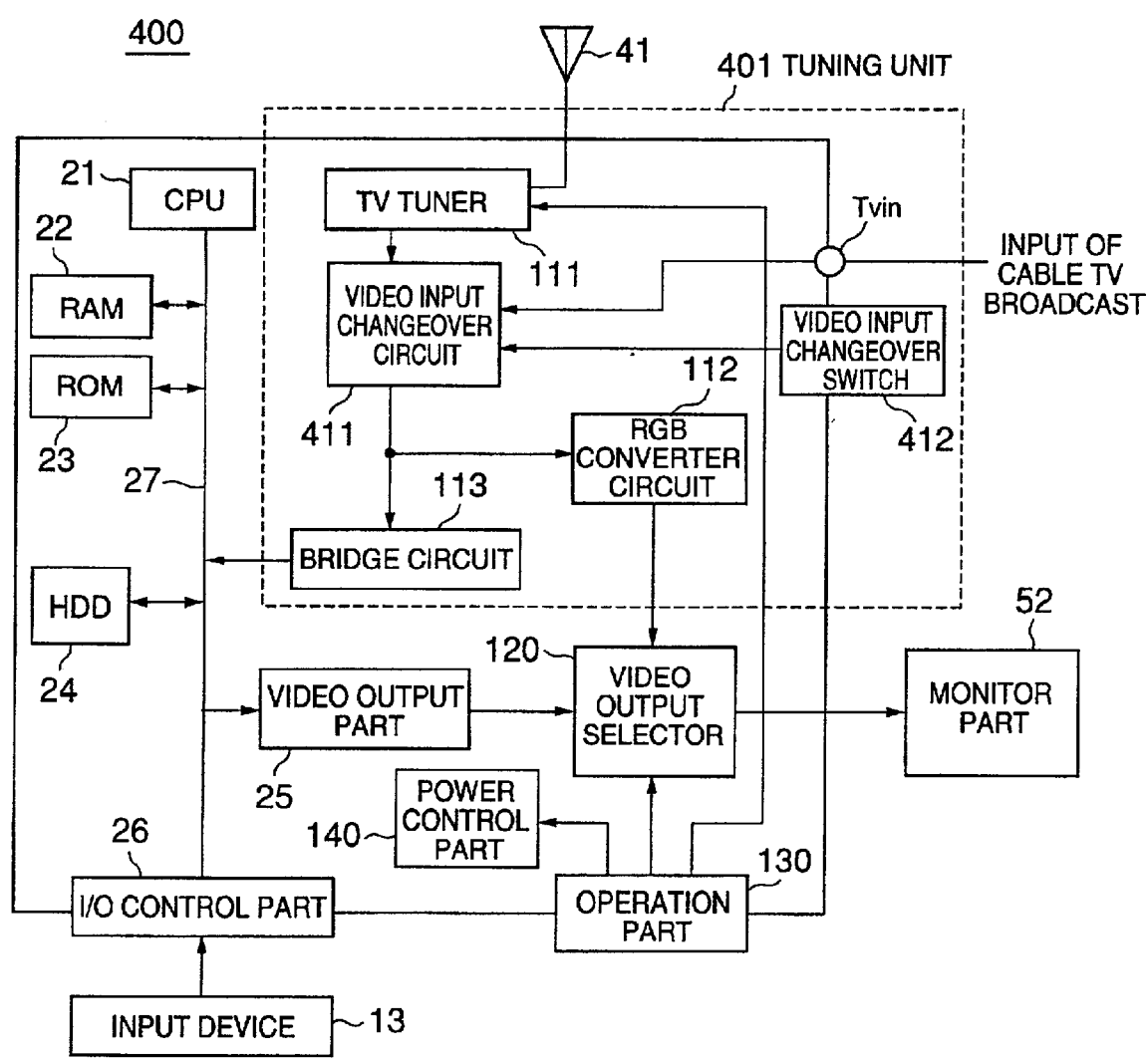
FIG. 12 is a block diagram showing a configuration of a PC according to a fourth embodiment of the present invention.

FIG. 12 is a block diagram showing a configuration of a PC 400 according to a fourth embodiment of the present invention. In FIG. 12, the same elements as those of FIG. 4 are referred to by the same numerals, and a description thereof will be omitted.

The PC 400 includes a tuning unit 401 that is different in configuration from the tuning unit 110 of the first embodiment. The tuning unit 401 includes a video input changeover circuit 411 provided between the TV tuner 111 and each of the RGB converter circuit 112 and the bridge circuit 113. The video input changeover circuit 411 is supplied with the NTSC video signal of a selected channel from the TV tuner 111 and an NTSC video signal from a video input terminal Tvin. A video signal from a videotape recorder, a DVD player, or a cable TV is input to the video input terminal Tvin, for instance.

A video input changeover signal is supplied from a video input changeover switch 412 to the video input changeover circuit 411. The video input changeover circuit 411 selectively outputs one of the video signal supplied from the TV tuner 111 and the video signal supplied from the video input terminal Tvin based on the video input changeover signal supplied from the video input changeover switch 412. The video signal output from the video input changeover circuit 411 is supplied to the RGB converter circuit 112 and the bridge circuit 113.

Like the TV tuner 111, the video input changeover circuit 411 is supplied with power from the power control part 140.

According to this embodiment, the video signal supplied from the TV tuner 111 or the video signal supplied form the video input terminal Tvin can be selected by operating the video input changeover switch 412. By outputting the video signal supplied from the TV tuner 111 from the video input changeover circuit 411 by operating the video input changeover switch 412, television broadcasts by ground waves can be watched on the monitor part 52 or stored in the HDD 24. On the other hand, by outputting the video signal supplied from the video input terminal Tvin from the video input changeover circuit 411 by operating the video input changeover switch 412, an image reproduced from a videotape or a DVD, or a cable TV broadcast can be watched on the monitor part 52 or stored in the HDD 24.

The first through fourth embodiments deal only with a video signal for simplicity purposes. An aural signal is supplied via a speech processing unit to a speaker so that sounds are output therefrom.

According to the first through fourth embodiments, the following functions can be realized without providing a TV tuner inside the monitor part of a PC.

TV broadcasts can be watched without starting the OS of a PC, thus reducing power consumption in the case of only watching the TV broadcasts.

An image received by a TV tuner can be stored in an HDD housed in the PC.

Since the TV tuner is not required to be housed in the monitor part of the PC, the above-described functions can be maintained even if the monitor part is replaced by a monitor without a built-in TV tuner.

Since the TV tuner is not required to be housed in both of the monitor part and the PC main body of the PC, the same function as that of a system in which both monitor part and PC main body include their respective TV tuners can be realized at low costs.

The present invention is not limited to the specifically disclosed embodiments, but variations and modifications may be made without departing from the scope of the present invention.

The present application is based on Japanese priority application No. 2001-260376 filed on Aug. 29, 2001, the entire contents of which are hereby incorporated by reference.

What is claimed is:

1. An information processing apparatus, comprising:
   a tuner receiving a signal according to a received broadcast;
   a first processing part performing a desired processing on the signal supplied from said tuner, converting the signal into a first signal of a given format, and outputting the first signal;
   a second processing part converting the signal supplied from said tuner into a second signal of the given format and outputting the second signal;
   an output part selectively outputting one of the first and second signals; and
   a supply switching circuit configured to switch a supply target to which drive power is to be supplied,
   wherein the first and second processing parts are startable independently of each other based on the switching of the supply switching circuit.

2. The information processing apparatus as claimed in claim 1, wherein said first processing part comprises:
   an operation unit performing an operation based on a program;
   a storage part for storing data;
   a bus for exchanging data between at least said operation part and said storage part;
   a bridge circuit converting the signal supplied from said tuner into data exchangeable between said operation part and said storage part through said bus; and
   a signal output part converting data on said bus into the first signal of the given format and outputting the first signal.

3. The information processing apparatus as claimed in claim 1, wherein said second processing part comprises a converter circuit converting the signal supplied from said tuner into the second signal of the given format.

4. The information processing apparatus as claimed in claim 1, further comprising a remote control part operating said tuner by remote control.

5. The information processing apparatus as claimed in claim 4, wherein said remote control part operates said tuner by wireless communication.

6. The information processing apparatus as claimed in claim 5, wherein the wireless communication is infrared communication.

7. The information processing apparatus as claimed in claim 5, wherein the wireless communication complies with a Bluetooth standard.

8. The information processing apparatus as claimed in claim 1, further comprising:

an operation part switching a first operation mode activating said tuner and said first and second processing parts and a second operation mode activating said tuner and said second processing part, wherein the supply switching circuit supplies the drive power to the first and second processing parts if the operation part selects the first operation mode and to the second processing part if the operation part selects the second operation mode.

9. The information processing apparatus as claimed in claim 1, wherein said second processing part further comprises an input changeover circuit switching the signal supplied from said tuner and a signal supplied from an external apparatus so as to selectively convert the signal supplied from said timer or the signal supplied from the external apparatus into the second signal of the given format.

10. The information processing apparatus as claimed in claim 1, wherein said first processing part comprises a central processing unit that performs the desired processing.

11. The information processing apparatus as claimed in claim 10, wherein said first processing part further comprises a hard disk drive storing the signal supplied from said tuner under a control of said central processing unit.

12. The information processing apparatus as claimed in claim 11, wherein a signal read out from the hard disk drive may be converted into the first signal.

13. The information processing apparatus as claimed in claim 1, wherein the signal supplied from said tuner is a video signal.

14. The information processing apparatus as claimed in claim 1, further comprising a monitor part, wherein:

said tuner is a television tuner; and the one of the first and second signals selectively output from said output part is supplied to said monitor part so that a video image according to the one of the first and second signals is displayed on said monitor part.

15. A method of switching operations of an information processing apparatus, wherein a first operation of receiving a broadcast and performing desired information processing on a signal otter received broadcast and a second operation of receiving a broadcast, converting a signal of the received broadcast directly into a signal of a given format, and outputting the converted signal are independently performable in the information processing apparatus by switching a supply target to which electric power is to be supplied.

16. The method as claimed in claim 15, wherein the first and second operations are independently performable by switching parts of the information processing apparatus to which parts the electric power is supplied.

17. The method as claimed in claim 15, wherein the desired information processing is performed by a central processing unit.

18. The method as claimed in claim 17, wherein the signal of the received broadcast is stored in a hard disk unit under control of the central processing unit.

19. The method as claimed in claim 18, wherein:

the data stored in the hard disk unit is converted into a signal of the given format of the first operation; and one of the converted signals of the first and second operations as selectively output.

20. The method as claimed in claim 19, wherein:

the converted signals are video signals; and the one of the converted signals is output to a monitor part of the information processing apparatus so that a video image according to the one of the converted signals is displayed on the monitor.

* * * * *

UNITED STATES PATENT AND TRADEMARK OFFICE
CERTIFICATE OF CORRECTION

PATENT NO. : 6,898,763 B2
DATED : May 24, 2005
INVENTOR(S) : Kunihiko Hagiwara et al.

It is certified that error appears in the above-identified patent and that said Letters Patent is hereby corrected as shown below:

Column 11,
Line 33, replace "timer" with -- tuner --.

Column 12,
Line 15, replace "otter" with -- of the --.
Line 36, replace "as" with -- is --.

Signed and Sealed this

Seventh Day of March, 2006

JON W. DUDAS
*Director of the United States Patent and Trademark Office*